Aug. 4, 1959             L. P. CROSET             2,897,660
TRANSMISSION COUPLINGS FOR SHAFTS AND THE LIKE
Filed Aug. 1, 1958                            3 Sheets-Sheet 2
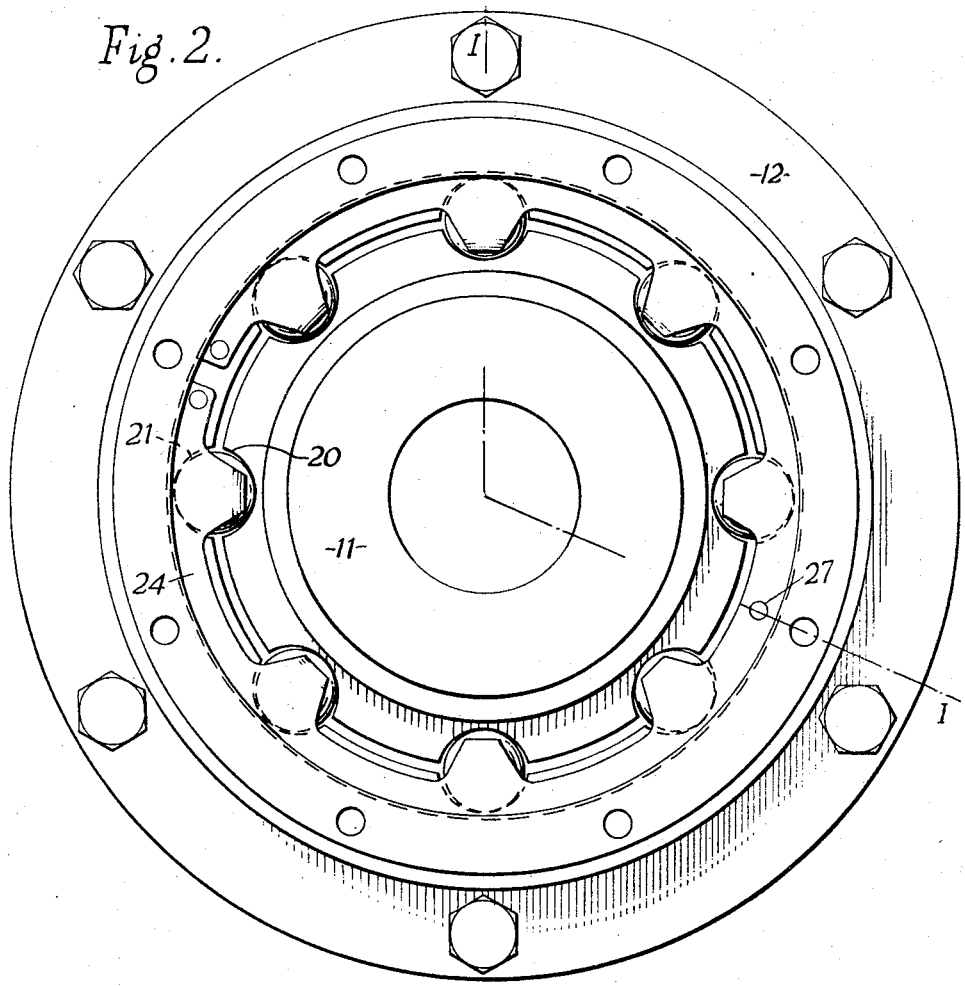
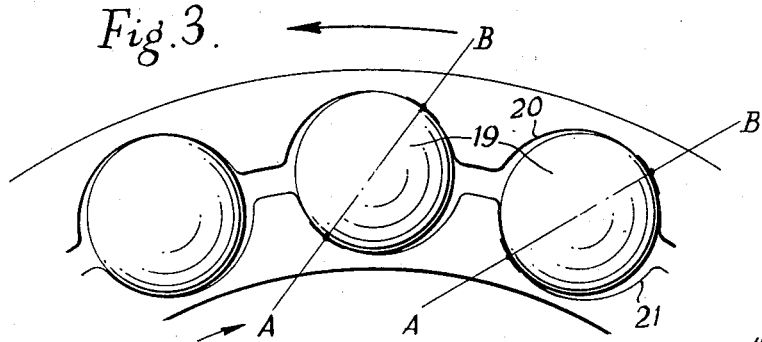
INVENTOR
LOUIS P. CROSET
BY
Irwin S. Thompson
ATTORNEY INVENTOR
LOUIS P. CROSET
BY
Irwin S. Thompson
ATTORNEY

United States Patent Office 2,897,660
Patented Aug. 4, 1959

2,897,660

TRANSMISSION COUPLINGS FOR SHAFTS AND THE LIKE

Louis P. Croset, Huddersfield, England

Application August 1, 1958, Serial No. 752,671

Claims priority, application Great Britain
August 8, 1957

7 Claims. (Cl. 64—6)

This invention relates to transmission couplings for shafts and the like providing accommodation for the angular misalignment of the connected shafts and also for the axial movement or end-float of one or both of the shafts which are coupled together.

In many power drives it is a requirement of the coupling that it should accommodate both misalignment and axial movement of the connected shafts without axial load being imposed upon the bearings supporting the shafts. Wherever such requirements are specified the driving hub or flange of a coupling has been provided with sliding splines and more frequently the power has been transmitted through a so-called self-aligning gear-coupling, the self-aligning property of which is achieved by provision of clearance or backlash between the external or internal gear teeth of the coupling members, it being claimed that such couplings permit free lateral float under all conditions of operation, which is not true and applies only when no load or torque is transmitted. The fact is that when load is transmitted, the force required to move axially one coupling member relative to the other is quite considerable, being equal to the tangential load on the teeth, multiplied by the co-efficient of friction.

In heavy-duty high-speed gear-coupling drives, what actually happens is that no lubricant can penetrate between the very highly loaded mating surfaces of the internal and external gear teeth, fretting takes place and actual seizing up of the gears may occur.

With said self-aligning gear-coupling drives between steam turbines and reduction gearing in marine installations such couplings have been known to seize up solid, burning-off having to be resorted to for their removal.

It has also been suggested to provide a coupling comprising an annular set of balls located between a hub and a sleeve that surrounds the hub, which balls seat in grooves in the sleeve, and in the hub, this suggestion however including no information as to the design of the grooves or the working clearance of the balls therein. However even if a normal clearance is provided the balls will also bind on the grooves upon angular misalignment occurring between said hub and sleeve. As far as can be ascertained this proposal has therefore not come into practical use and the use of teeth integral with the hub is used in practice in spite of the fact that the teeth are complicated in design and expensive to manufacture and the disadvantage of considerable wear and possibility of seizure.

According to the invention I provide a coupling for transmitting power between a hub member and a sleeve member which surrounds the hub member comprising an annular set of metal balls each engaged in a groove in the hub member and in a groove in the sleeve member, each of said grooves extending in the axial direction of said members and having a radius greater than that of the ball, and retaining means carried by one of said members (hereinafter called the carrier member) and including a pair of retaining fingers for each ball, said fingers being on opposite sides of the ball and extending into at least one of the grooves, the free ends of the finger being spaced apart a distance smaller than the diameter of the ball, whereby all the balls are carried by said carrier member when the other member is removed, each pair of fingers being spaced apart from each other between their free ends and their roots a distance greater than the diameter of the ball to permit a limited rolling movement of the ball, said ball engaging both grooves with a working clearance when said members are in axial alignment.

It might be thought that a set of balls would be impracticable because of indentation of races but this can be avoided by using hardened balls and grooves, a sufficient number of balls (4 to 32) and balls of adequate diameter.

Preferably the radius of the grooves is 3 to 5 percent larger than the radius of the balls whereby the balls engage the grooves at small localised points of areas on the balls viz., one point engaging the sleeve groove and one point engaging the hub groove, these points being in line and offset from the coupling radius to about 45°. However, under maximum torque load conditions, when elastic deformation of both ball and groove surface is taken into account the balls engage the grooves over an arc of about 45°. The result is that the balls carry their load for the most part in compression this being much more desirable than carrying the load in shear as occurs if the grooves are cut on a radius only having a working clearance when each groove engages the ball over say 80° of the circumference.

The invention will now be described by way of example with reference to the accompanying diagrammatic drawings, wherein:

Figure 2 is an axial view thereof;

Figure 3 is an axial view of three of the balls engaged in the grooves;

Figure 1:
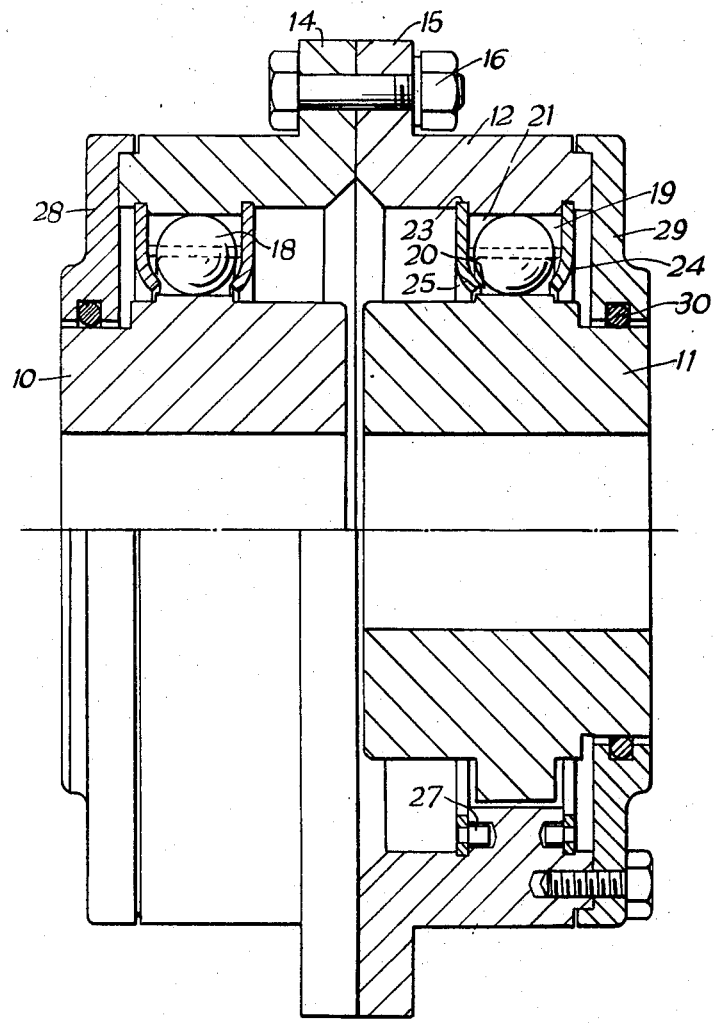
Figure 1 is a sectional view (on the line 1—1 on Figure 2) of a coupling made in accordance with the invention.

Referring to Figures 1 and 2, a pair of hub members 10, 11 of equal diameter are to be connected respectively to two shafts requiring provision for free end float and axial misalignment. These hub members are supported by a common sleeve member 12 which however is made in two parts bolted together by bolts 16, so that in effect it is a single sleeve member. Two annular sets 18, 19 of hardened steel balls are located between the two hub members 10, 11 respectively on the one hand and the sleeve member 12 on the other. The hub members are each formed with a flange which is grooved to provide a locating groove 20 for each ball. Similarly the sleeve member 12 has two inwardly projecting flanges grooved to form corresponding ball locating grooves 21. Each part of the member 12 has a pair of split spring rings 24, 25 engaged in grooves in the member 12. These rings have their inner peripheries turned in towards the ball and serve to hold the balls 18, 19 in the sleeve member during assembly before insertion of the hub members. The rings are scalloped at their inner peripheries to clear the grooved flanges on the hub members, and to form fingers that enter the grooves so that each ball is located by a pair of fingers. Each ring also carries a pin 27 engaging a hole or projection on the sleeve member to prevent rotation of the rings relatively to the sleeve member. The sleeve member 12 carries caps 28, 29 at opposite ends and these caps are spaced from the hub members to allow for angular misalignment and carry packing rings 30, 31 that hold lubricant between them in the coupling.

The grooves 20, 21 are preferably generated on a single radius which is 3 to 5 percent greater than the ball radius. However, only a working clearance (determined by the ball diameter, say about one thousandth of an inch per one inch diameter of the ball) is provided between the ball and groove in the direction of the radius through the ball and coupling. By this expedient, the balls will not only accommodate angular misalignment but will be loaded at positions angularly offset from a line drawn through the ball centre as at A and B in Figure 3 so that the balls are mainly loaded in compression rather than in shear. If the radius of the grooves were only sufficiently larger than that of the balls to provide a working clearance the balls would be loaded in shear.

Figure 4:
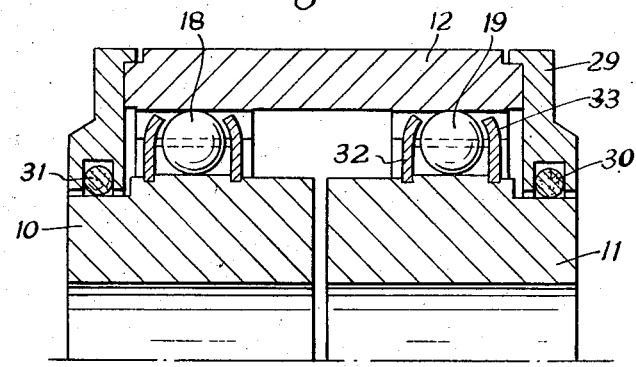
Figure 4 is a view similar to the upper half of Figure 1 but showing a modified construction.

As shown in Figure 4 the rings may be replaced by similar rings 32, 33 which are sprung into grooves in the hub members. In this example the member 12 is shown an integral part.

Figure 5:
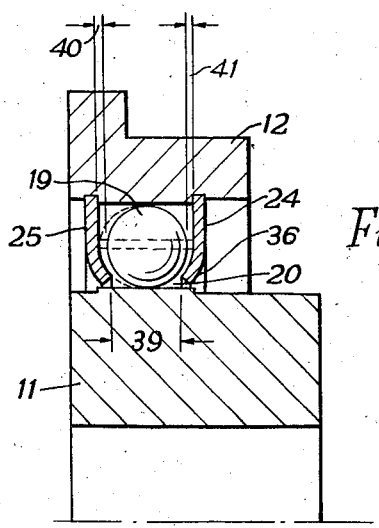
Figure 5 is an enlarged view of part of Figure 1.

The precise form of the rings is illustrated more clearly in Figure 5. The rings have fingers 36 which are curved inwardly towards the ball and enter the groove 20. The free ends of the fingers in a groove are spaced apart a distance 39 less than the diameter of the ball e.g. 50 to 70 percent of the ball diameter. The parts of the fingers adjacent the free ends are curved to the ball radius. The rings 24, 25 (and their fingers respectively) between their free ends and their roots are spaced apart a distance equal to about 115 to 125 percent of the diameter of the ball. Thus in the middle position of the ball there is a space 40, 41 on either side equal to say 10 percent of the ball diameter. The ball centre can thus have a total movement equal to 20 percent of the ball diameter and the relative axial movement of the hub and sleeve ("end float") will be 40 percent of the ball diameter. A coupling having two sets of balls as in Figure 1 will therefore have an end float up to 80 percent of the ball diameter. Similar conditions apply for the modification of Figure 4.

In the arrangement of Figures 1 and 5 the sleeve member 12 serves as a carrier member for the rings and balls to carry these as a unit before fitting the hub members. In the modification of Figure 4 the hub members serve as the carrier members and carry the rings and balls before the hub members are introduced into the sleeve members.

Instead of providing two hub members and a common floating sleeve it is possible to provide two sleeve members and a common floating hub.

If desired rubber or other resilient means may be provided between the fingers and the balls to damp out vibration and noise.

I claim:

1. A coupling for transmitting power between a hub member and a sleeve member which surrounds the hub member comprising an annular set of metal balls each engaged in a semicylindrical groove in the hub member and in a similar groove in the sleeve member, each of said grooves extending in the axial direction of said members, being each formed on a single radius slightly greater than that of the ball, said radius having its centre coincident with the axis of the ball radially of said members, and retaining means carried by one of said members, said retaining means including a pair of retaining fingers for each ball, said fingers being on opposite sides of the ball and extending into the grooves of the other member, the free ends of the fingers being spaced apart a distance smaller than the diameter of the ball, whereby all the balls are carried by and form a permanent assembly with one of said members, each pair of fingers being spaced apart from each other between their free ends and their roots, a distance greater than the diameter of the ball to permit a limited rolling movement of the ball engaging both grooves with a working clearance when said members are in axial alignment, said fingers also retaining the balls centrally placed in the grooves within desired limits.

2. A coupling as claimed in claim 1, wherein the fingers are integral parts of a pair of split rings engaged in grooves in said one of said members.

3. A coupling as claimed 1 wherein the fingers of each pair between their free ends and their roots are spaced apart from each other a distance equal to from 15 to 25 percent of the ball diameter.

4. A coupling as claimed in claim 1, wherein fingers near their free ends are curved (in axial section) to the shape of the ball.

5. A coupling as claimed in claim 1 wherein the grooves are part cylindrical and have a radius 3 to 5 percent greater than the ball radius and have only a working clearance with the balls in the direction of the adjacent coupling radii when the said members are in alignment.

6. A coupling as claimed in claim 1, wherein two such sets of balls are provided between two hub members respectively and a common floating sleeve.

7. A coupling as claimed in claim 1, wherein two such sets of balls are provided between two sleeve members respectively and a common floating hub member.

References Cited in the file of this patent

UNITED STATES PATENTS

| | | |
|---|---|---|
| 1,675,065 | Thomas | June 26, 1928 |
| 1,717,816 | Sykes | June 18, 1929 |
| 1,763,332 | Sykes | June 10, 1930 |
| 1,972,779 | Krodoska | Sept. 4, 1934 |

FOREIGN PATENTS

| | | |
|---|---|---|
| 377,761 | Great Britain | Aug. 4, 1932 |